3,709,817
Patented Jan. 9, 1973

3,709,817
SELECTIVE HYDROCRACKING AND ISOMERIZATION OF PARAFFIN HYDROCARBONS
Robert M. Suggitt and John H. Estes, Wappingers Falls, and Stanley Kravitz, Wiccopee, N.Y., assignors to Texaco Inc., New York, N.Y.
No Drawing. Filed May 18, 1971, Ser. No. 144,622
Int. Cl. C10g 35/08
U.S. Cl. 208—112                                       18 Claims

ABSTRACT OF THE DISCLOSURE

Paraffin hydrocarbons are selectively hydrocracked and isomerized under controlled conversion conditions by contacting the hydrocarbon with hydrogen, a fluorided Group VII–B or VIII metal-alumina catalyst and water or water precursors as a conversion reaction moderator. By employing a fluorided metal-alumina catalyst and water or water precursor moderator, paraffin hydrocarbons are selectively hydrocracked and isomerized in a manner such that the selectivity, activity and product distribution is controlled over the course of the conversion reaction.

BACKGROUND OF THE INVENTION

This invention relates to a process for the conversion of paraffin hydrocarbons having at least six carbon atoms to more valuable products. In particular, this invention relates to a process for catalytically converting paraffin hydrocarbons under controlled temperature conditions to highly branched hydrocarbon products. In one of its more specific aspects this invention relates to the conversion of paraffin hydrocarbons in the presence of a composite catalyst possessing a hydrogenating component and a cracking component where the selectivity of the process is reversibly controlled through the addition of a moderator during conversion.

Processes for the conversion of paraffin hydrocarbons have been known for many years. A plurality of conversion reactions wherein hydrocarbons are converted to more valuable by-products has been practiced employing a wide variety of catalysts and operating conditions. Well established processes include arrangement of molecular structure at elevated temperatures by contacting the hydrocarbon with a catalyst and when conducted in the presence of hydrogen have been broadly termed hydroprocesses.

Among the hydroprocesses known to the art is included hydrocracking where the charge stock is contacted with a hydrocracking catalyst at elevated temperatures and pressures in the presence of hydrogen thereby converting the hydrocarbon to lighter products. The catalysts employed in the course of hydrocracking vary in composition but in general contain a cracking component and a hydrogenation component making up the composite material. Such conventional hydrocracking catalysts include a hydrogenating component on a support of the cracking component. The hydrogenating component frequently is a Group VII–B or VIII metal or component thereof, for example, a metal such as platinum, palladium, rhodium, ruthenium or rhenium and mixtures thereof. The metal is generally present in an amount of between 0.1 to 5.0 and preferably 0.5 to 2.0 percent by weight of the catalyst. The cracking component may comprise catalysts which ordinarily are used in catalytic cracking units. Such catalysts are generally composed of a mixture of refractory amorphous inorganic oxides such as magnesia, silica-alumina and the like. More recently crystaliline aluminosilicate zeolites such as zeolite X and Y, generally in admixture with other inorganic oxides such as silica-alumina, have been found to be suitable supports for the hydrogenating component especially when they have been subjected to an ion exchange treatment to reduce the alkali metal content of the zeolite or mixture.

By virtue of the composite nature of the catalyst described above, contacting of a paraffin hydrocarbon charge therewith results in a multiplicity of conversion reactions such that the feedstock is converted to lighter materials by the action of cracking and hydrogenation. While cracking and hydrogenation account for the main conversion reactions, other mechanisms are also involved but are obscured by virtue of the operating conditions and most importantly as a consequence of the charge being contacted with the catalyst having a plurality of functions.

The consequences flowing from the use of the highly active catalyst described above in conversion reactions involving paraffin hydrocarbons having at least six carbon atoms has been the lack of control over catalyst activity and selectivity where the desired effect is to optimize a particular set of products from a complex reaction while simultaneously avoiding permanent damage to the catalyst in terms of its original selectivity and activity. Heretofore, depending on the end product sought it was necessary to choose from a large number of catalytic materials that catalyst which provided the best selectivity. Variations in feedstock and alterations in the sought after products brought forth the use of a multiplicity of reactors and catalysts needed to accommodate the plurality of reactions involved.

It is therefore an object of this invention to provide a means for converting paraffin hydrocarbons to preselected products by employing a catalyst having hydrocracking and hydrogenation activity under processing conditions capable of controlling catalyst activity and selectivity.

Another object of this invention is to provide a means for bringing an extraordinary selectivity shift in catalyst behavior.

Another object of this invention is to provide a method for controlling the selectivity of the catalyst employing as a catalytic moderator a material heretofore considered a catalyst poison.

Yet another object of this invention is to provide a method for reversibly controlling the selectivity of a catalytic system and a process employing the same through the addition of a moderator to the paraffin hydrocarbon conversion reaction where the moderator introduces no permanent adverse effect on the catalyst's subsequent ability to function normally in the absence thereof.

Other objects and advantages will become apparent from a reading of the following description and examples.

SUMMARY OF THE INVENTION

Broadly, this invention contemplates a hydrocarbon conversion process which comprises contacting a paraffin hydrocarbon containing at least six carbon atoms with hydrogen, a fluorided Group VII–B or VIII metal-alumina catalyst and water wherein water is present during said contacting in an amount of from about $3 \times 10^{-5}$ to $5 \times 10^{-4}$ gram mole of water per hour per gram of said catalyst. Water contemplated herein and present during the conversion process can be introduced to the conversion zone or produced in situ by the introduction of oxygenated organic compounds which decompose under the process conditions to provide about $3 \times 10^{-5}$ to $5 \times 10^{-4}$ gram mole of water per hour per gram of catalyst.

According to our invention we have found a means for reversibly controlling the selectivity of a paraffin hydrocarbon conversion process through the addition of water as a moderator during the period of reaction. The beneficial effects hereinafter more fully described was unexpected inasmuch as water has been known as a catalyst poision and especially as a strong deactivator of halogenated metal-alumina catalysts. Further, not only has water been found to be capable of altering catalyst selectivity and the source of the hydrocarbon conversion reaction, but additionally the shift in reaction and selectivity is controllable and reversible. Essentially, through the actions of water in the hydroprocessing reaction, the effect is to permit a fine tuning of the catalytic system to optimize a particular set of products from a complex reacion.

Pursuant to this invention, conversion of paraffin hydrocarbons having at least six and up to about 40 carbon atoms is undertaken at conditions including temperatures from about 400 to 900° F., preferably 450 to 750° F., at liquid hourly space velocities of from about 0.5 to 8.0, preferably 1.0 to 2.0, and hydrogen to hydrocarbon mole ratios in the range of about 0.1:1 to 10:1, preferably 0.5:1 to 5:1.

The catalyst employed in our process is one which comprises a member of Group VII–B or VIII of the Periodic Table, alumina and fluorine and represents a well known class of hydrocracking catalysts. Such a catalyst represents a composite material possessing hydrogenating activity and cracking activity by virtue of its composition. The hydrogenating component corresponds to the Group VII–B or VIII metal present on the cracking support such as alumina. The catalyst is provided with additional acidity by virtue of the presence of from about 0.5 to 15.0 weight percent chemically combined fluorine. Exemplary of the Group VII–B and VIII metals are rhenium, platinum, rhodium and ruthenium and the metal is present in amounts ranging from about 0.01 to 5.0 weight percent and preferably from about 0.1 to 2.0 weight percent based on the composite catalyst. Aluminas in various forms may be used as a component of the catalyst and particularly those aluminas having replaceable surface hydroxyl groups and surface areas of from 50 to 800 square meters per gram using the BET method. Included with our definition of alumina we mention, for example, eta-alumina, gamma-alumina, and silica stabilized alumina, i.e., aluminas containing approximately 5 weight percent silica, thoria-alumina, zirconia-alumina and titania-alumina. Preferably we employ aluminas having surface areas of from 50 to 400 square meters per gram and particularly eta- and gamma-alumina.

The catalyst described above can be prepared by methods known to the art. The Groups VII–B or VIII metal as a component of the catalyst can be provided to the alumina by impregnating with a soluble salt of the metal followed by calcination at temperatures of from 600 to 1200° F. for several hours. Additional acidity is introduced to the metal-alumina composite by contacting the composite with a fluoriding agent such as aqueous hydrogen fluoride, vaporized boron or ammonium fluoride or treatment with other well known fluoriding compounds such as carbon tetrafluoride or tetrafluoroethylene thereby introducing to the catalyst chemically combined fluorine in an amount of from 0.5 to 15.0 weight percent and preferably from 0.5 to 6.0 weight percent.

We have found that the role of water in a system composed of a paraffin hydrocarbon feedstock having at least six carbon atoms and up to about 40 carbon atoms in contact with the aforementioned catalyst and hydrogen is to suppress the cracking aspect of the catalyst, that is to say, to interfere with the acidity function of the catalyst surface while at the same time avoiding permanent damage or poisoning of the catalyst. In this regard we have found that low concentrations of the moderator introduced in the course of converting the paraffin hydrocarbon strongly shifts the product distribution such that the catalyst is moderated to the extent that the cracking propensity of the catalytic material in inhibited and with the higher amounts of the moderator recited herein essentially eliminated. Consequently, the nature of the conversion reaction can be converted from one essentially of hydrocracking a paraffin feedstock to one of selective hydrocracking and/or hydroisomerization. Discontinuation of water introduction to the conversion process results in a reversal of catalyst selectivity and redirects the reaction toward the original conditions, that is to say, substantial hydrocracking of the feedstock will again occur. As can be seen, the effect of water moderation is reversible, i.e., diminished or eliminated rates of moderator addition reverse the process from one of hydroisomerization or selective hydrocracking towards hydrocracking.

Extremely low concentrations of water present during the course of paraffin conversion have been found to perform the function detailed above. The amount of water beneficially employed and present in the course of the process varies from about $3 \times 10^{-5}$ to $5 \times 10^{-4}$ gram mole of water per hour per gram of said catalyst and preferably from $5 \times 10^{-5}$ to $4 \times 10^{-4}$. Water is of course a common contaminant of paraffin hydrocarbon feedstocks. Depending upon the stock, the paraffin hydrocarbon can contain up to 200 p.p.m. of dissolved water. It has been found, however, that the amount of water normally dissolved in paraffinic stocks is not sufficient to materially affect the predominant hydrocracking reaction over the catalyst contemplated herein. In the instant invention, we have found that when water is introduced to or formed in situ during paraffin conversion in the amount recited above which exceed the solubility of water in the hydrocarbon feed at ambient conditions, the normal hydrocracking reaction is moderated and selective hydrocracking or isomerization reactions predominate. Any water in the feedstock is considered and employed as a portion of that present in the course of the process.

In selecting the amount of water present during conversion, we have found that the amount is dependent upon the temperature of the reaction such that higher amounts of the moderator are required to inhibit hydrocracking at higher temperatures while lesser amounts perform the same function at lower temperatures, i.e., amounts such as $5 \times 10^{-5}$ to $1 \times 10^{-4}$ gram mole of water per hour per gram of catalyst are sufficient where the process is carried out at temperatures of about 500° F. whereas higher amounts such as $1 \times 10^{-4}$ to $5 \times 10^{-4}$ gram mole of water per hour per gram of catalyst are needed when process temperatures are about 700° F. Likewise, water introduction and its effect upon the process is responsive to the percent fluorine on the catalyst. A catalyst containing lower amounts of fluorine such as 0.5 weight percent requires less water to moderate the reaction whereas fluorine contents of about 6 weight percent require the higher rates of water introduction. One convenient means of introducing the moderator to the reaction zone has been to add the moderator to the paraffin hydrocarbon stream prior to introducing the stream to the reaction chamber. Moderator introduction can be on a continuous basis or alternatively the water may be pulsed or intermittently introduced to the reaction such that the average rate of water introduction is within the ranges stated above. An additional factor in selecting the rate of water introduction resides in the carbon number of the feedstock, i.e., less water is required when the feedstock consists of lower molecular weight paraffin such as hexane or heptane whereas increased amounts of water are called for as the molecular weight of the hydrocarbon feed increases, as for example, where the feedstock is a paraffin wax containing 27 or more carbon atoms.

While water per se is preferably employed as the conversion reaction moderator by introducing the same to the feedstock prior to its contact with the catalyst in the reaction zone, water precursors may also be used to good advantage. By water precursors we mean an oxygenated organic compound capable of conversion to water under the reaction conditions and catalyst recited above. A plurality of organic compounds can be employed as water precursors including oxygenated compounds such as acids, alcohols, aldehydes, ketones, ethers and esters. Under the conversion conditions and catalyst employed herein, the precursor is converted in the hydrogen environment to water and a paraffin of equivalent carbon number. As in the case of water itself, the precursors can be introduced to the paraffin hydrocarbon feed prior to introduction to the conversion zone in amounts of from $1 \times 10^{-6}$ to $5 \times 10^{-4}$ gram mole of oxygenated compound per hour per gram of said catalyst. Specific examples of water precursors contemplated herein include acids such as methanoic acid, ethanoic acid, etc.; alcohols such as methanol, ethanol, 1-propanol, 2-propanol, n-butanol, secondary butanol, tertiary butanol, etc.; aldehydes such as methanal, ethanal, propanal, etc.; ketones such as 2-propanone and 2-butanone; ethers such as ethoxyethane; and esters such as methyl acetate. In general the oxygenated organic compound selected should be soluble in the paraffin hydrocarbon and contain oxygen that can be reduced or dissociated from the parent molecule to produce water.

By providing a means for controlling the activity and selectivity of the process conducted in the presence of the aforementioned catalyst through the use of water moderation, a plurality of paraffin hydrocarbons having from 6 to 40 carbon atoms are readily selectively hydrocracked and hydroisomerized to more valuable products. For example, light straight run having an initial boiling point of 70° F. and an end point of about 200° F. containing $C_6$ normal paraffins can be isomerized in the presence of the catalyst and moderator at temperatures of from 450 to 750° F. with minimal cracking such that the selectivity to high octane number blending components is favored illustrated by yields of branched isomers. Individual $C_7$ to $C_{10}$ paraffins or mixtures of $C_7$ to $C_{10}$ paraffins as found in heavy straight run fractions having initial boiling points of about 200° F. and end points of about 400° F. can be hydroprocessed in the presence of the instant catalyst system and moderator to selectively hydrocrack and/or isomerize the same to propane, isobutane, isopentane and isohexane fractions at temperatures of from 450 to 750° F. Paraffins having from 11 to 18 carbon atoms and middle distillate fractions having initial boiling points of about 400° F. and end points of about 600° F. containing $C_1$ to $C_{18}$ paraffins can be selectively hydrocracked at temperatures of from 450 to 900° F. to provide normal and iso $C_5$–$C_9$ gasoline blending materials. $C_{10}$ to $C_{27}$ paraffins, fuel oils and gas oils having boiling ranges of from 560 to 1000° F. and comprising such materials as waxy vacuum gas oils can be isomerized at temperatures of from 600 to 800° F. to provide yields of middle distillates useful as jet and diesel fuels. In particularly desirable embodiments paraffinic residual oils, slack waxes and petrolatums are hydroisomerized in the presence of the aforementioned catalyst and moderator to provide greater yields of high viscosity index base oils having lower pour points at temperatures of from 600 to 750° F.

Product selectivity from the conversion reaction can be easily adjusted by varying the introduction rate of water or precursor to the process such that the higher levels of moderator favor isomerization whereas lower levels favor selective hydrocracking. Hydrogen pressures ranging from 50 to 3000 p.s.i.g. may be employed in the process. One convenient means of introducing the moderator to the reaction zone has been to add water or the precursor to the paraffin hydrocarbon stream prior to introduction into the reaction chamber. Alternatively, the moderator may be separately and directly introduced to the reaction zone. Introduction can be on a continuous basis or the moderator may be pulsed or intermittently introduced to the reaction such that the average rate of moderator introduction is from about $3 \times 10^{-5}$ to $5 \times 10^{-4}$ gram mole of water per hour per gram of catalyst.

In order to more fully illustrate the nature of our invention and manner of practicing the same, the following examples are presented. In these examples the best mode contemplated by us for carrying out our invention is set forth.

Example I

A charge stock consisting of a mixture of $C_{10}$–$C_{14}$ normal paraffins was contacted with a catalyst comprising 0.47 weight percent platinum on alumina fluorided to a 4% level. Conversion conditions included a temperature of 650° F., 500 p.s.i.g. of hydrogen flowing at the rate of 3 cubic feet per hour, a catalyst charge of 75 grams (100 cc.) and the charge stock was introduced at the rate of 100 cc. per hour or a space velocity of 1.0. The initial charge stock was analyzed and found to be free of branch chain paraffins and had the following distribution of normal paraffins: $C_{10}$ 9.0 weight percent, $C_{11}$ 31.6 weight percent, $C_{12}$ 28.8 weight percent, $C_{13}$ 23.7 weight percent and $C_{14}$ 6.9 weight percent. An initial conversion reaction was undertaken to determine how the catalyst converted the charge stock to cracked products in the absence of the moderator water. Samples were collected after 6 hours (Period I) and analyzed by gas chromatography to give the product distribution on a weight percent basis recorded in Table I. After the initial six hour period, the same feedstock was contacted with the catalyst and in this instance in the presence of water for 24 hours (Period II) and Table I shows the effect of the moderator introduction. During this 24 hour period, conversion was undertaken in the presence of $1.2 \times 10^{-4}$ gram mole of water per hour per gram of catalyst. During Period III extending over 42 hours water introduction was increased to $1.7 \times 10^{-4}$ gram mole of water per hour per gram of catalyst during conversion and Table I shows the effect of this level of moderator introduction. Following Period III water introduction was terminated and conversion was continued in the absence of added moderator for twelve hours as recorded under Period IV. The table shows that the cessation of moderator introduction results in a reversal of catalyst activity in that the catalyst is sensitive to water concentration in a reversible manner.

TABLE I

| Product analysis | Period | | | |
|---|---|---|---|---|
| | I | II | III | IV |
| <$C_{10}$ | 87.7 | 5.3 | 0.2 | 6.4 |
| Iso-$C_{10}$ | 0.7 | 3.7 | 1.4 | 3.7 |
| n-$C_{10}$ | 0.8 | 8.0 | 9.1 | 7.3 |
| Iso-$C_{11}$ | 2.9 | 15.5 | 6.6 | 14.8 |
| n-$C_{11}$ | 1.6 | 17.8 | 23.7 | 16.6 |
| Iso-$C_{12}$ | 1.1 | 18.6 | 10.0 | 18.4 |
| n-$C_{12}$ | 1.8 | 12.9 | 22.3 | 12.9 |
| Iso-$C_{13}$ | 0.5 | 12.5 | 9.9 | 13.3 |
| n-$C_{13}$ | | 5.4 | 14.9 | 6.0 |
| Iso-$C_{14}$ | | 0.1 | 0.6 | 0.2 |
| n-$C_{14}$ | | 0.2 | 1.3 | 0.4 |

From Table I, introduction of water in the course of conversion has an extraordinary effect on catalyst selectivity. By virtue of the presence of water during conversion isomerization is permitted to function at reasonable levels. Moreover, the effect is reversible such that when water introduction is terminated the hydrocracking activity of the catalyst gradually returns. The catalytic process initially converting normal paraffins to products comprising 87.7 percent cracked material was moderated to alter its selectivity in the presence of water to yield approximately 5.3 percent cracked product while exhibiting 50.4 percent isomerization and further to 0.2 percent cracked product and 38.5 percent isomerization.

Example II

A charge stock consisting of a mixture of $C_{10}$–$C_{14}$ normal paraffins was contacted with a catalyst comprising 0.5 weight percent platinum on alumina fluorided to a 6 percent level. Conversion conditions included a temperature of 600° F., 500 p.s.i.g. of hydrogen flowing at the rate of 3 cubic feet per hour, a catalyst charge of 78 grams (100 cc.) where the charge stock was introduced at the rate of 100 cc. per hour or a space velocity of 1.0. Initial conversion of the feedstock for a 4 hour period was undertaken in the absence of water or water precursor as a moderator. Thereafter, throughout further 4 hour periods methyl alcohol was introduced, the rate of introduction during each successive period being greater than the preceding one. Table II summarizes the product distribution on a weight percent basis as related to the amount of methyl alcohol introduced during conversion and alternately in terms of water present as a consequence of the introduction of the precursor methyl alcohol expressed in parts of moderator per million parts of paraffinic hydrocarbon.

TABLE II

| P.p.m. methyl alcohol/liquid charge | Equivalent g./mole water/hr./gm. catalyst | Percent | | |
|---|---|---|---|---|
| | | Cracked $C_{10}$ | Isomerized ($C_{10}$-$C_{14}$) | Unchanged |
| 0 | 0 | 90.64 | 7.65 | 1.71 |
| 10,000 | $3 \times 10^{-4}$ | 27.90 | 45.76 | 26.34 |
| 15,000 | $4.5 \times 10^{-4}$ | 10.14 | 29.76 | 60.10 |

The data in Table II shows that low levels of water generated in situ through the conversion of methyl alcohol moderate the activity of the catalyst to give some cracking with a high degree of conversion to isomerized products. As the level of the water precursor increased, the overall selectivity to isomerized products in the process improved while simultaneously suppressing the cracking activity.

Example III

A charge stock consisting of a mixture of $C_{10}$–$C_{14}$ normal paraffins and toluene was contacted with a catalyst comprising 0.5 weight percent platinum on alumina fluorided to a 4% level. Conversion conditions included a temperature of 650° F., 800 p.s.i.g. of hydrogen flowing at the rate of 3 cubic feet per hour, a catalyst charge of 100 cc. and a space velocity of 1.0. The charge stock consisted of 11.0 volume percent toluene along with the following distribution of normal paraffins in volume percent; $C_{10}$ 9.0, $C_{11}$ 25.7, $C_{12}$ 27.8; $C_{13}$ 23.7 and $C_{14}$ 2.8. Conversion was undertaken in the presence of $1.7 \times 10^{-4}$ gram mole of water per hour per gram of catalyst and Table III records the results.

TABLE III

| Product analysis, vol. percent | 30 hours | 60 hours |
|---|---|---|
| Toluene | 0 | 0 |
| Saturated naphthenes | 11.7 | 11.5 |
| <$C_{10}$ | 0.7 | 0.1 |
| Iso-$C_{10}$ | 0.6 | 0.7 |
| n-$C_{10}$ | 8.8 | 8.7 |
| Iso-$C_{11}$ | 2.6 | 3.1 |
| n-$C_{11}$ | 23.9 | 23.5 |
| Iso-$C_{12}$ | 4.2 | 4.5 |
| n-$C_{12}$ | 24.0 | 23.7 |
| Iso-$C_{13}$ | 4.2 | 4.6 |
| n-$C_{13}$ | 17.6 | 17.2 |
| Iso-$C_{14}$ | 0.5 | 0.6 |
| n-$C_{14}$ | 1.8 | 1.8 |

We claim:

1. A hydrocarbon conversion process which comprises contacting a parffin hydrocarbon containing at least 6 carbon atoms with hydrogen, a fluorided Group VII–B or VIII metal-alumina catalyst and water wherein water is present during said contacting in an amount of from about $3.5 \times 10^{-5}$ to $5 \times 10^{-4}$ gram mole of water per hour per gram of said catalyst.

2. A process according to claim 1 wherein said contacting is conducted at a temperature of from 400 to 900° F.

3. A process according to claim 1 wherein said contacting is conducted at a temperature of from 450 to 750° F.

4. A process according to claim 1 wherein said water is present in an amount of from $5 \times 10^{-5}$ to $4 \times 10^{-4}$ gram mole of water per hour per gram of said catalyst.

5. A process according to claim 1 wherein an oxygenated organic compound having from one to four carbon atoms is introduced during said contacting and converted in situ to water.

6. A process according to claim 5 wherein said oxygenated organic compound is methyl alcohol.

7. A process according to claim 5 wherein said oxygenated organic compound is ethanol.

8. A process according to claim 1 wherein said contacting is conducted at a liquid hourly space velocity of from 0.5 to 8.0.

9. A process according to claim 1 wherein said contacting is conducted at a hydrogen pressure of from 50 to 3,000 p.s.i.g.

10. A process according to claim 1 wherein said catalyst comprises from about 0.01 to 5.0 weight percent of a metal selected from the group consisting of platinum, palladium, rhodium, ruthenium and rhenium.

11. A process according to claim 1 wherein said catalyst comprises from about 0.5 to 15.0 weight percent fluorine.

12. A process according to claim 1 wherein said catalyst comprises from about 0.5 to 6.0 weight percent fluorine.

13. A process according to claim 1 wherein said Group VIII metal is platinum.

14. A process according to claim 1 wherein said contacting includes a hydrogen to hydrocarbon mole ratio of about 0.1:1 to 10:1.

15. A process according to claim 1 wherein said hydrocarbon has from 6 to 40 carbon atoms.

16. A process according to claim 1 wherein said hydrocarbon is a mixture of $C_{10}$ to $C_{14}$ paraffins.

17. A process according to claim 1 wherein said hydrocarbon is a residual oil.

18. A process according to claim 1 wherein said hydrocarbon is a slack wax.

References Cited

UNITED STATES PATENTS

| 3,062,735 | 11/1962 | Donaldson et al. | 208—57 |
| 3,078,323 | 2/1963 | Kline et al. | 260—683.68 |
| 3,328,289 | 6/1967 | Streed | 208—89 |
| 3,617,522 | 11/1971 | Schrepfer | 208—139 |

DELBERT E. GANTZ, Primary Examiner

G. E. SCHMITKONS, Assistant Examiner

U.S. Cl. X.R.

208—139, 141; 260—683.65, 683.68